(12) United States Patent
Lin et al.

(10) Patent No.: US 7,659,831 B2
(45) Date of Patent: Feb. 9, 2010

(54) HAND-HELD DEVICE WITH LAMP FOR DISPLAYING PLAYTIME FOR STORAGE MEDIUM

(75) Inventors: Chen-Jian Lin, Taipei (TW); Ming-He Dai, Taipei (TW)

(73) Assignee: Inventec Appliances Corp., Taipei (TW)

( * ) Notice: Subject to any disclaimer, the term of this patent is extended or adjusted under 35 U.S.C. 154(b) by 922 days.

(21) Appl. No.: 11/336,545

(22) Filed: Jan. 20, 2006

(65) Prior Publication Data

US 2006/0171663 A1 Aug. 3, 2006

(30) Foreign Application Priority Data

Jan. 28, 2005 (TW) ............................... 94102824 A

(51) Int. Cl.
*G08B 5/22* (2006.01)

(52) U.S. Cl. .................................. 340/815.45; 345/158
(58) Field of Classification Search ............ 340/815.45; 345/158, 173; 715/210
See application file for complete search history.

(56) References Cited

U.S. PATENT DOCUMENTS 7,178,106 B2* 2/2007 Lamkin et al. ............... 715/716
2006/0265637 A1* 11/2006 Marriott et al. .......... 715/500.1

* cited by examiner

*Primary Examiner*—Daniel Wu
*Assistant Examiner*—Shirley Lu

(57) ABSTRACT

A hand-held device is provided. The hand-held device is used for playing a storage medium and has an indication apparatus. The indication apparatus is divided into a plurality of sections, and one of the sections is driven to twinkle according to the specific period having elapsed for playing the storage medium.

20 Claims, 4 Drawing Sheets

HAND-HELD DEVICE WITH LAMP FOR DISPLAYING PLAYTIME FOR STORAGE MEDIUM

FIELD OF THE INVENTION

The present invention relates to a hand-held device, and more particularly to a hand-held device with a lamp for displaying the period for playing a storage medium.

BACKGROUND OF THE INVENTION

There are more and more electronic devices available in the market, such as the PDA (Personal Digital Assistant), the MP3 player, the portable storage medium playing device (e.g. the DVD player), etc. However, there are still some defects on these electronic devices.

Please refer to FIG. 1, which is a schematic diagram showing the structure of a portable storage medium playing device in the prior art. The playing device 1 includes a reading device 11, a plurality of keys 12 and a screen 13. The storage medium could be played after the user put it into the reading device 11, and the content thereof would be displayed on the screen 13. During the playing of the storage medium, if the user wants to know its playtime or remaining time, he has to operate the keys 12 to make the playtime or remaining time shown on the screen 13. This causes a nuisance for the user.

From the above description, it is known that how to develop a hand-held device with the function of automatically displaying the period for playing the storage medium has become a major problem to be solved. In order to overcome the drawbacks in the prior art, a hand-held device with a lamp for displaying the period for playing the storage medium is provided. The particular design in the present invention not only solves the problems described above, but also is easy to be implemented. Thus, the invention has the utility for the industry.

SUMMARY OF THE INVENTION

In accordance with one aspect of the present invention, a hand-held device with a lamp for displaying the period for playing a storage medium is provided. The lamp is divided into a plurality of sections. In this way, the user could know the remaining time for the storage medium by observing which section is currently twinkling.

In accordance with another aspect of the present invention, a hand-held device is provided. The hand-held device is used for playing a storage medium and has an indication apparatus. The indication apparatus is divided into a plurality of sections, and one of the sections is driven to twinkle according to a specific period having elapsed for playing the storage medium.

Preferably, the hand-held device is a portable storage medium playing device.

Preferably, the portable storage medium playing device is a DVD player.

Preferably, the storage medium is a DVD.

Preferably, the indication device is divided into the plurality of uniform sections.

Preferably, the indication apparatus is a lamp.

Preferably, the total period for playing the storage medium is T, the indication apparatus is divided into n sections, the specific period having elapsed for playing the storage medium is t, and an $m^{th}$ section is currently twinkling, then the following formula is observed: $(m-1)*T/n \leq t < T*m/n$, wherein * denotes multiplication sign and / denotes division sign.

In accordance with a further aspect of the present invention, a hand-held device is provided. The hand-held device includes a reading device for reading a storage medium; a microprocessor electrically connected to the reading device for detecting a specific period having elapsed for playing the storage medium; a memory electrically connected to the microprocessor for being accessed by the microprocessor; and an indication apparatus electrically connected to the microprocessor and divided into a plurality of sections for displaying the specific period for playing the storage medium.

Preferably, the reading device is electrically connected to the microprocessor via a first I/O pin.

Preferably, the microprocessor is electrically connected to the indication apparatus via a second I/O pin.

Preferably, wherein one of the sections is driven to twinkle in response to the specific period for playing the storage medium.

In accordance with further another aspect of the present invention, a driving method is provided. The driving method is used in a hand-held device including an indication apparatus divided into a first number of sections, comprising the steps of (a) reading and playing a storage medium; (b) detecting a total period for playing the storage medium and dividing the total period into the first number of parts; (c) driving a specific section of the indication apparatus to winkle; (d) detecting at specific intervals, a specific period having elapsed for playing the storage medium; (e) driving another section of the indication apparatus to twinkle according to the specific period having elapsed for playing the storage medium; and (f) repeating the step (d) and the step (e) until the specific period equals the total period.

Preferably, the hand-held device further comprises a reading device for reading the storage medium.

Preferably, the specific interval is a ratio of the total period for playing the storage medium to a quantity of the plurality of sections.

Preferably, the total period for playing the storage medium is T, the specific period having elapsed for playing the storage medium is t, and an $m^{th}$ section is currently twinkling, the following formula is observed: $(m-1)*T/n \leq t < T*m/n$, wherein * denotes multiplication sign and / denotes division sign.

In accordance with further another aspect of the present invention, a driving method is provided. The driving method is used in a hand-held device including an indication apparatus divided into a plurality of sections, comprising the steps of (a) playing a storage medium in the hand-held device; (b) driving a specific section of the indication apparatus to twinkle; (c) driving another section of the indication apparatus to twinkle according to a specific period having elapsed for playing the storage medium and (d) repeating the step (c) until the completion of playing of the storage medium.

Preferably, the specific period having elapsed for playing the storage medium is detected at specific intervals.

Preferably, the specific interval is a ratio of a total period for playing the storage medium to a quantity of the plurality of sections.

Preferably, the total period for playing the storage medium is T, the indication apparatus is divided into n sections, the specific period having elapsed for playing the storage medium is t, and an $m^{th}$ section is currently twinkling, the following formula is observed: $(m-1)*T/n \leq t < T*m/n$, wherein * denotes multiplication sign and / denotes division sign.

In accordance with further another aspect of the present invention, a method for driving an indication apparatus divided into a plurality of sections is provided. The method includes the steps of (a) playing a storage medium and driving a specific section of the indication apparatus to twinkle; (b) detecting at specific intervals, a specific period having elapsed for playing the storage medium; (c) driving another section of the indication apparatus to twinkle according to the specific period having elapsed for playing the storage medium and turning off the section being currently twinkling; and (d) repeating the step (b) and the step (c) until the completion of playing of the storage medium.

Preferably, the indication apparatus is a lamp.

Preferably, the storage medium is a DVD.

Preferably, the total period for playing the storage medium is T, the indication apparatus is divided into n sections, the specific period having elapsed for playing the storage medium is t, and an $m^{th}$ section is currently twinkling, the following formula is observed: $(m-1)*T/n \leq t < T*m/n$, wherein * denotes multiplication sign and / denotes division sign.

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
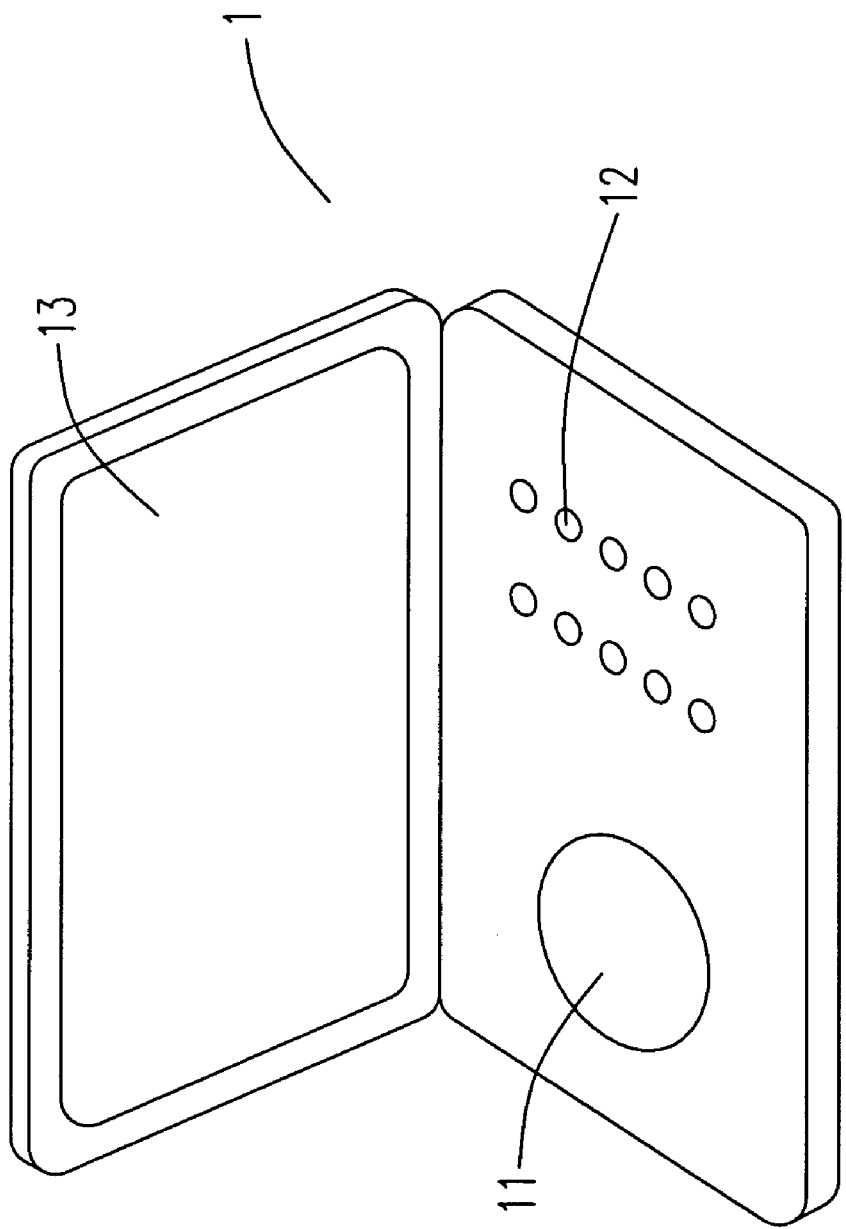
FIG. 1 is a schematic diagram showing the structure of a portable storage medium playing device in the prior art.
Figure 2:
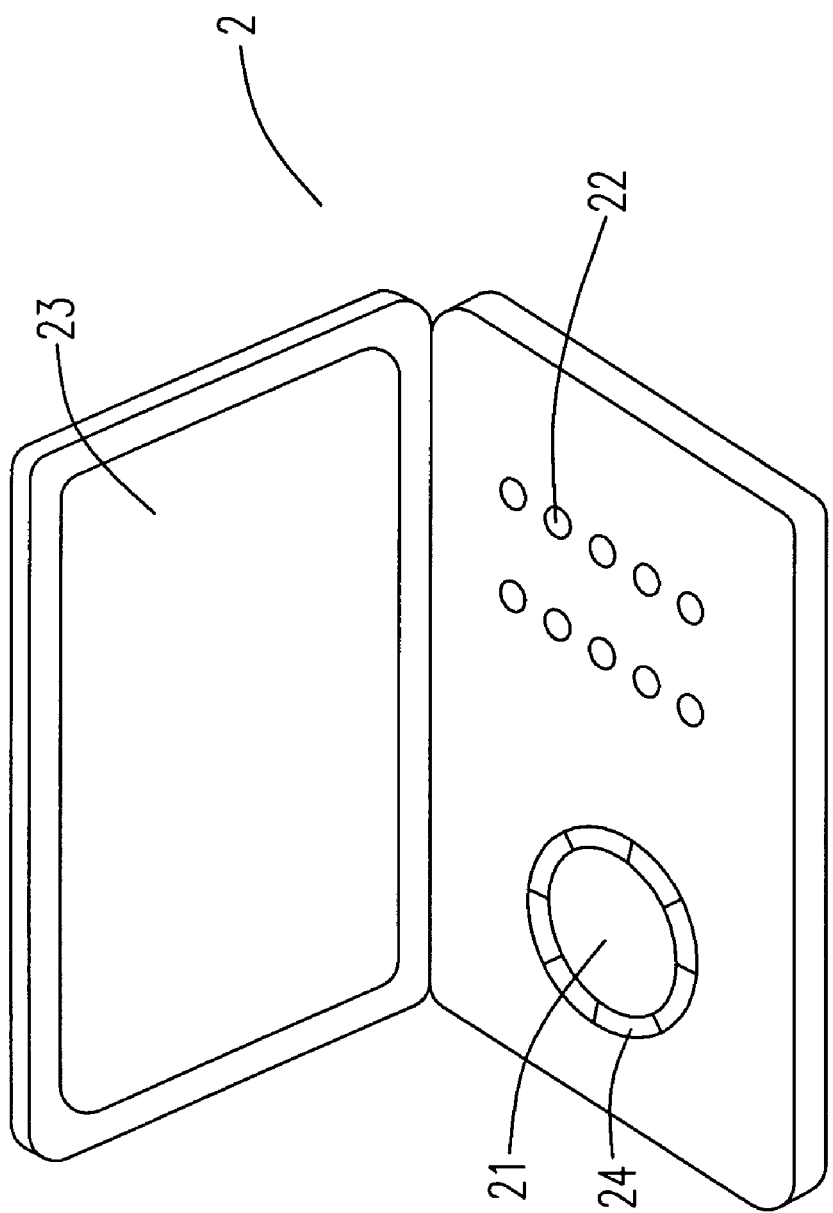
FIG. 2 is a schematic diagram showing the structure of a portable storage medium playing device according to a preferred embodiment of the present invention.

Please refer to FIG. 2, which shows the structure of a portable storage medium playing device according to a preferred embodiment of the present invention. Preferably, the portable storage medium playing device is a DVD player. The portable storage medium playing device 2 includes a reading device 21, a plurality of keys 22, a screen 23 and a lamp 24. As shown in FIG. 2. the lamp 24 is circularly disposed at the peripheral of the reading device 21 and divided into a plurality of uniform sections. When the user plays a storage medium (such as a DVD) with the reading device 21, one of the sections of the lamp 24 is driven to twinkle according to a specific period having elapsed for playing the storage medium. In this way, the user could determine the playtime and remaining time for the storage medium by observing which section is currently twinkling.

Figure 3:
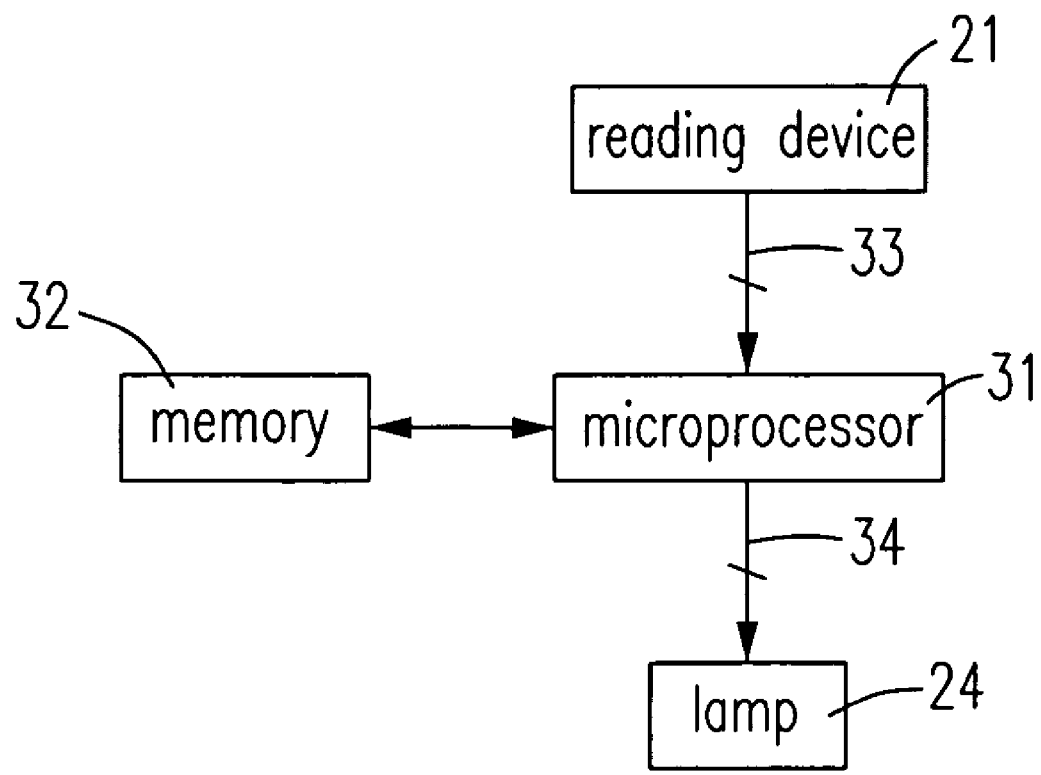
FIG. 3 is the circuit diagram of a portable storage medium playing device according to a preferred embodiment of the present invention.

Please refer to FIG. 3, which shows the circuit diagram of a portable storage medium playing device according to a preferred embodiment of the present invention. The circuit of the portable storage medium playing device includes the reading device 21, a microprocessor 31, a memory 32 and the lamp 24. The reading device 21 is electrically connected to the microprocessor via first I/O pins 33 for reading and playing the storage medium. The microprocessor 31 is electrically connected to the lamp 24 via second I/O pins for detecting the specific period having elapsed for playing the storage medium. The memory 32 is accessed by the microprocessor 31, and one of the sections of the lamp 24 is driven to twinkle according to the specific period having elapsed for playing the storage medium.

Figure 4:
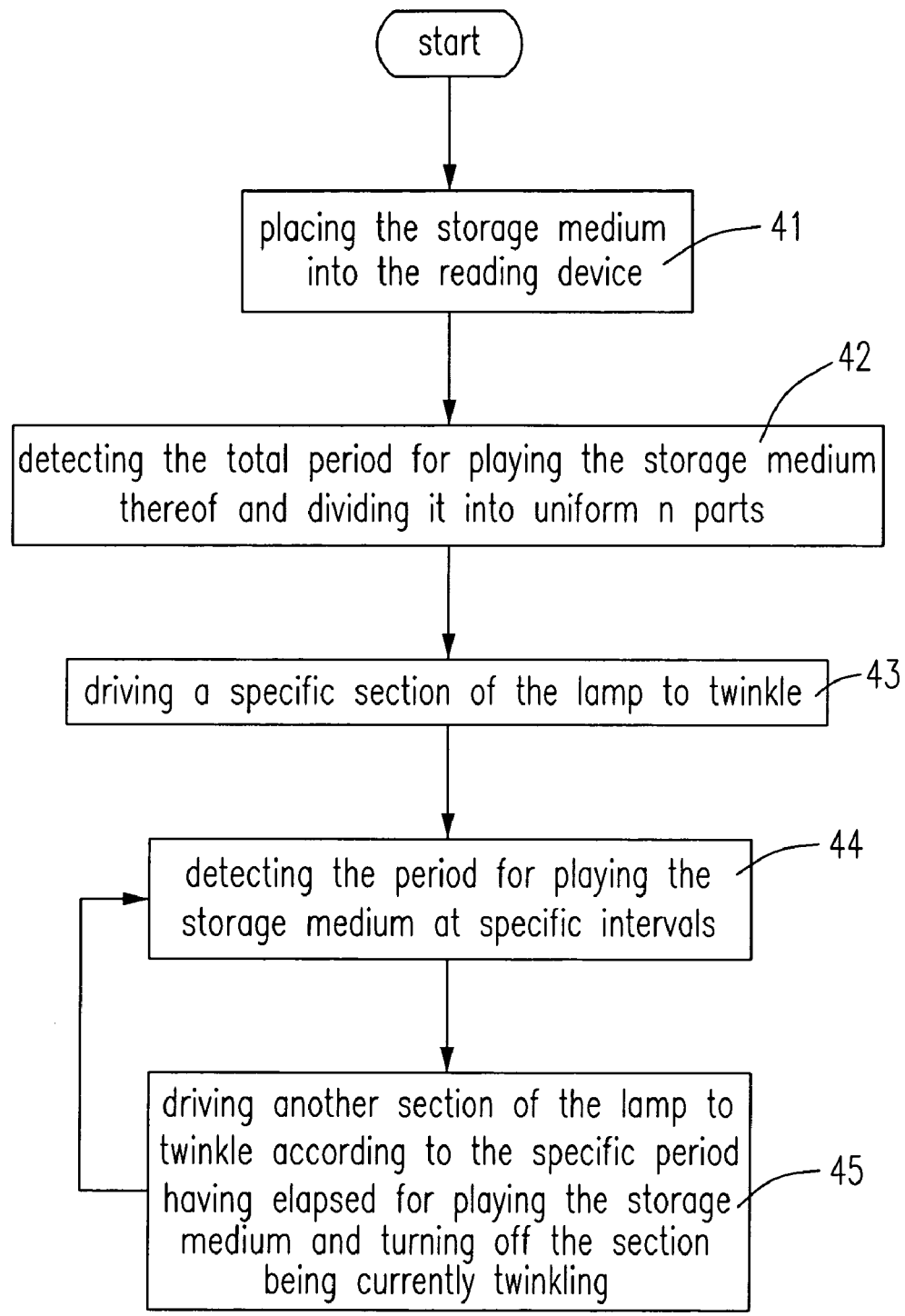
FIG. 4 is a flowchart of the driving method used in a portable storage medium playing device according to a preferred embodiment of the present invention.

Please refer to FIG. 4, which shows a flowchart of the driving method used in a portable storage medium playing device according to a preferred embodiment of the present invention. At first, the storage medium is placed into the reading device for being played (step 41). Before the storage medium is played, the total period for playing the storage medium thereof (T) is detected and divided into uniform n parts (step 42), wherein the period for each part is T/n. Next, a specific section (e.g. the first section) of the lamp is driven to twinkle (step 43). Then, the period for playing the storage medium is detected at specific intervals, e.g. T/n (step 44), and another section of the lamp is driven to twinkle according to the specific period having elapsed for playing the storage medium and the section being currently twinkling is turned off for saving the power consumption (step 45). Afterwards, steps 44 to 45 are repeated until the specific period equals the total period or the user finishes watching the storage medium. Assume that the specific period for playing the storage medium is t, and the $m^{th}$ section of the lamp is currently twinkling, the following formula is observed: $(m-1)*T/n \leq t < T*m/n$, wherein * denotes multiplication sign and / denotes division sign.

Assume that the total period for playing the storage medium is 2 hours (120 minutes) and the lamp 24 is divided into 8 uniform sections, and thus the period for each section is 120/8=15 minutes. Referring to the above-mentioned equation, it is known that when the specific period for playing the storage medium reaches 47 minutes, the fourth section of the lamp 24 will be twinkling. And when the specific period for playing the storage medium reaches 1 hour and 24 minutes, the sixth section of the lamp 24 will be twinkling. Accordingly, the user could know the playtime and remaining time for the storage medium by observing which section is currently twinkling.

In the above embodiment, the lamp 24 is circularly disposed at the peripheral of the reading device 21. However, the shape and the position of the lamp 24 can be modified according to the practical needs, which is not limited to the aspect illustrated in the above embodiment.

In conclusion, the present invention provides a hand-held device with a lamp for displaying the period for playing a storage medium. The lamp is divided into a plurality of sections. In this way, the user could know the remaining time of the storage medium by observing which section is currently twinkling. Therefore, the present invention effectively solves the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A hand-held device for playing a storage medium, said hand-held device comprising:

an indication apparatus, which is divided into a plurality of sections, and one of the sections being driven to twinkle according to a specific period having elapsed for playing the storage medium, wherein if a total period for playing the storage medium is T, the indication apparatus is divided into n sections, the specific period having elapsed for playing the storage medium is t, and an $m^{th}$ section is currently twinkling, then the following formula is observed:

(m−1)*T/n$\leqq$t<T*m/n, wherein * denotes multiplication sign and / denotes division sign.

2. The hand-held device of claim 1, wherein the hand-held device is a portable storage medium playing device.

3. The hand-held device of claim 2, wherein the portable storage medium playing device is a DVD player.

4. The hand-held device of claim 3, wherein the storage medium is a DVD.

5. The hand-held device of claim 1, wherein the indication device is divided into the plurality of uniform sections.

6. The hand-held device of claim 1, wherein the indication apparatus is a lamp.

7. A hand-held device, comprising:
   a reading device for reading a storage medium;
   a microprocessor electrically connected to the reading device for detecting a specific period having elapsed for playing the storage medium;
   a memory electrically connected to the microprocessor for being accessed by the microprocessor; and
   an indication apparatus electrically connected to the microprocessor and divided into a plurality of sections for driving one of the sections to twinkle according to the specific period having elapsed for playing the storage medium,
   wherein if a total period for playing the storage medium is T, the indication apparatus is divided into n sections, the specific period having elapsed for playing the storage medium is t, and an $m^{th}$ section is currently twinkling, then the following formula is observed:
   (m−1)*T/n$\leqq$t<T*m/n, wherein * denotes multiplication sign and / denotes division sign.

8. The hand-held device of claim 7, wherein the reading device is electrically connected to the microprocessor via first I/O pins.

9. The hand-held device of claim 7, wherein the microprocessor is electrically connected to the indication apparatus via second I/O pins.

10. A driving method used in a hand-held device comprising an indication apparatus divided into a first number of sections, comprising the steps of:
   (a) reading and playing a storage medium;
   (b) detecting a total period for playing the storage medium, and dividing the total period into the first number of parts;
   (c) driving a specific section of the indication apparatus to twinkle;
   (d) detecting, at specific intervals, a specific period having elapsed for playing the storage medium;
   (e) driving another section of the indication apparatus to twinkle according to the specific period having elapsed for playing the storage medium; and
   (f) repeating the step (d) and the step (e) until the specific period equals the total period,
   wherein if the total period for playing the storage medium is T, the specific period having elapsed for playing the storage medium is t, and an $m^{th}$ section is currently twinkling, the following formula is observed:
   (m−1)*T/n$\leqq$t<T*m/n, wherein * denotes multiplication sign and / denotes division sign.

11. The driving method of claim 10, wherein the hand-held device further comprises a reading device for reading the storage medium.

12. The driving method of claim 11, wherein the specific interval is a ratio of the total period for playing the storage medium to a quantity of the plurality of sections.

13. The driving method of claim 11, further comprising the step of turning off said another section being currently twinkling for saving the power consumption.

14. A driving method used in a hand-held device comprising an indication apparatus divided into a plurality of sections, comprising the steps of:
   (a) playing a storage medium in the hand-held device;
   (b) driving a specific section of the indication apparatus to twinkle;
   (c) driving another section of the indication apparatus to twinkle according to a specific period having elapsed for playing the storage medium; and
   (d) repeating the step (c) until the completion of playing of the storage medium,
   wherein if the total period for playing the storage medium is T, the indication apparatus is divided into n sections, the specific period having elapsed for playing the storage medium is t, and an $m^{th}$ section is currently twinkling, the following formula is observed:
   (m−1)*T/n$\leqq$t<T*m/n, wherein * denotes multiplication sign and / denotes division sign.

15. The driving method of claim 14, wherein the specific period having elapsed for playing the storage medium is detected at specific intervals.

16. The driving method of claim 15, wherein the specific interval is a ratio of a total period for playing the storage medium to a quantity of the plurality of sections.

17. The driving method of claim 15, further comprising the step of turning off said another section being currently twinkling for saving the power consumption.

18. A method for driving an indication apparatus divided into a plurality of sections, comprising the steps of:
   (a) playing a storage medium and driving a specific section of the indication apparatus to twinkle;
   (b) detecting, at specific intervals, a specific period elapsed for playing the storage medium;
   (c) driving another section of the indication apparatus to twinkle according to the specific period having elapsed for playing the storage medium and turning off the section being currently twinkling; and
   (d) repeating the step (b) and the step (c) until the completion of playing of the storage medium,
   wherein if a total period for playing the storage medium is T, the indication apparatus is divided into n sections, the specific period having elapsed for playing the storage medium is t, and an $m^{th}$ section is currently twinkling, the following formula is observed;
   (m−1)*T/n$\leqq$t<T*m/n, wherein * denotes multiplication sign and / denotes division sign.

19. The driving method of claim 17, wherein the indication apparatus is a lamp.

20. The driving method of claim 17, wherein the storage medium is a DVD.

* * * * *